United States Patent [19]

Ben-Artzi

[11] Patent Number: 4,797,881
[45] Date of Patent: Jan. 10, 1989

[54] BRIDGE SYSTEM FOR CONNECTING NETWORKS

[75] Inventor: Amatzia Ben-Artzi, Sunnyvale, Calif.

[73] Assignee: Sytek, Inc., Mountain View, Calif.

[21] Appl. No.: 25,386

[22] Filed: Mar. 12, 1987

[51] Int. Cl.[4] ................................................. H04J 3/26
[52] U.S. Cl. ........................................ 370/88; 370/94
[58] Field of Search .................. 370/88, 85, 86, 94, 370/60; 340/825.03, 825.52

[56] References Cited

U.S. PATENT DOCUMENTS

| 4,539,679 | 9/1985 | Bux et al. | 370/88 |
| 4,550,402 | 10/1985 | Gable et al. | 370/85 |
| 4,577,313 | 3/1986 | Sy | 370/88 |
| 4,627,052 | 12/1986 | Hoare et al. | 370/94 |
| 4,672,607 | 6/1987 | Nakayashiki et al. | 370/88 |
| 4,706,081 | 11/1987 | Hart et al. | 370/94 |
| 4,718,060 | 1/1988 | Oguchi et al. | 370/88 |

Primary Examiner—Douglas W. Olms
Assistant Examiner—Melvin Marcelo
Attorney, Agent, or Firm—Thomas E. Schatzel

[57] ABSTRACT

A large number of local area networks are each connected to a backbone network through a network interface module (NIM). The NIM transmits messages from one local area network to another local area network across the backbone network by enveloping the local area network message inside the data field of a backbone network message. Each of the NIM constructs a table of addresses. The backbone network messages are each addressed to the particular destination NIM. The destination NIM receives the backbone network message and de-envelopes it for transmission over its own local area network.

14 Claims, 2 Drawing Sheets

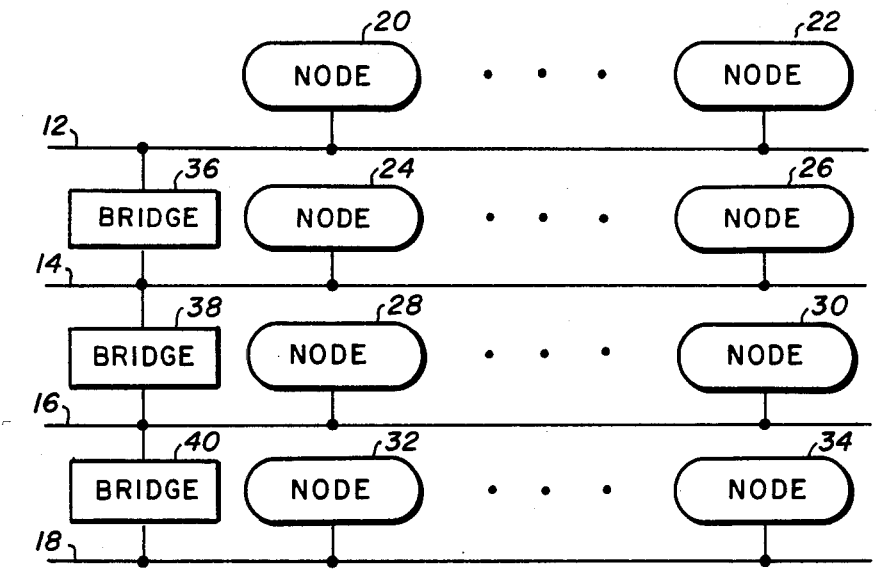
FIG_1 PRIOR ART
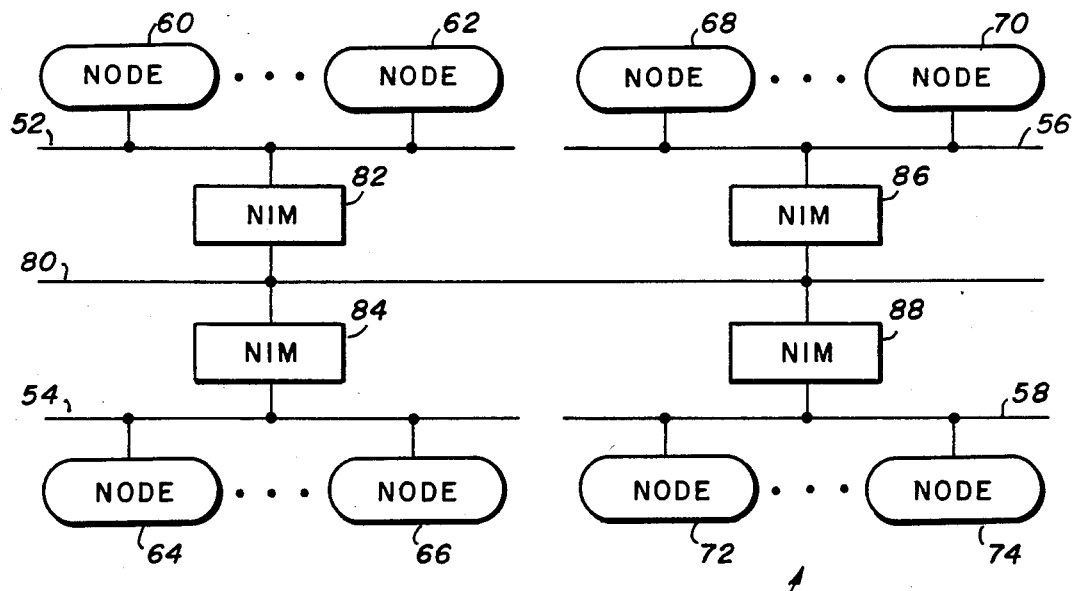
FIG_2

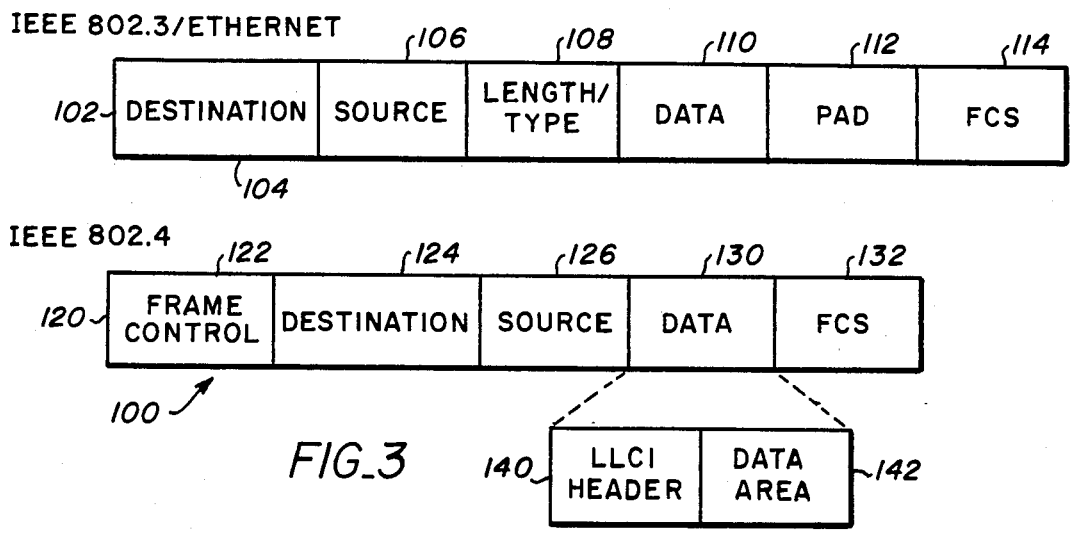
FIG_3
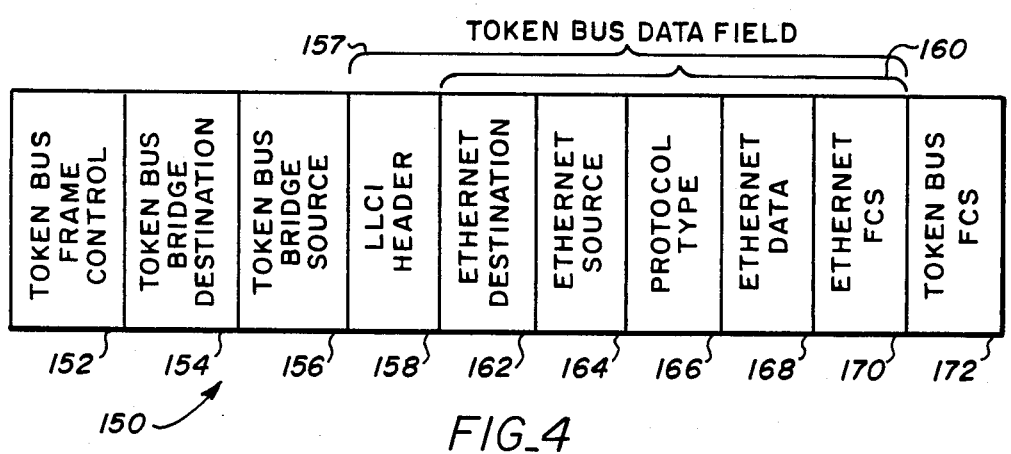
FIG_4
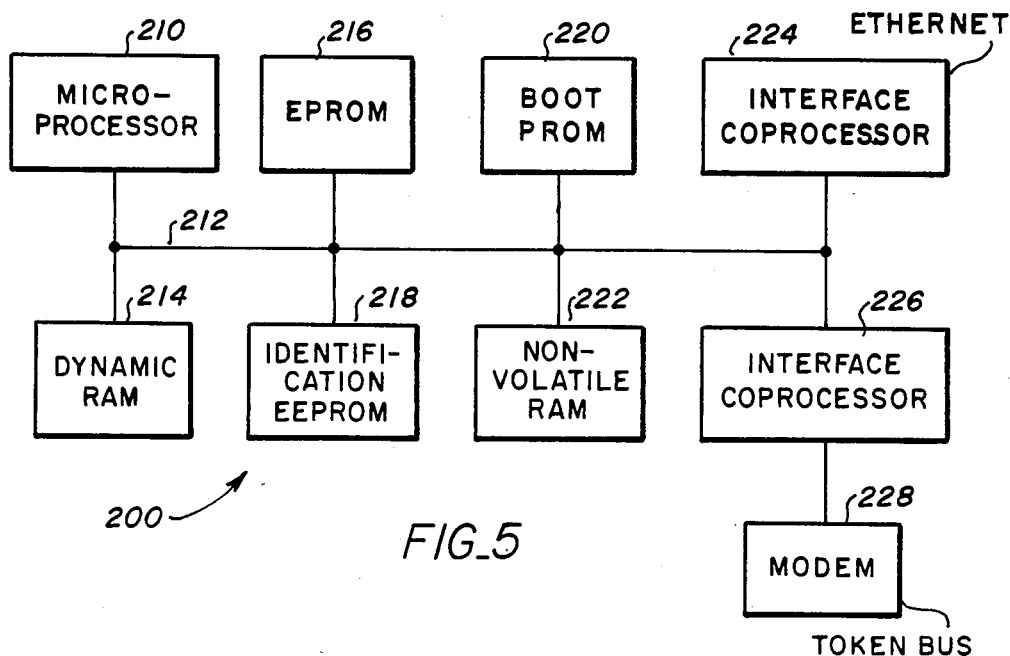
FIG_5

BRIDGE SYSTEM FOR CONNECTING NETWORKS

BACKGROUND OF THE INVENTION

1. Field of the Invention

This invention relates generally to interconnecting local area networks and more specifically to interconnecting ethernet networks using a token bus network backbone.

2. Description of the Prior Art

Local area computer networks (LAN) are installed in stand alone networks known as segments. Each segment connects all of the computers of a specific group. The segments can each comprise a different company department, such as an accounting or engineering department. Messages are transmitted in packets along the network. Each packet contains information identifying the source computer and the computer to which the message is intended. Each computer on the network typically has a filter which screens out messages which are not intended for it. One type of network commonly used as a local area network is the ethernet network.

Devices called bridges are used to connect different segments together. If there are several segments, then a bridge is used to connect each segment to the next segment in the series. When the bridge receives a message packet, it looks at the destination code and determines if the message is intended for a node in that same segment. If it is, then the bridge can ignore it. If it is intended for a node not in that segment, then the bridge passes the message over to the next adjacent segment. The message is passed along from segment-to-bridge-to-segment until it reaches the proper destination segment.

A problem with this way of connecting segments is that the entire system becomes increasingly inefficient with each additional segment. This is because each message must hop from segment-to-segment until it reaches its destination. Thus, the traffic load is increased in each segment between the source segment and the destination segment.

Another problem with this type of system is that ethernet networks cannot be used over long distances. A token bus network can be used to cross long distances. However, transmitting between an ethernet and a token bus network has proved difficult due to the differences in the medium access control protocols of the networks.

SUMMARY OF THE PRESENT INVENTION

It is therefore an object of the present invention to provide a system for connecting together a large number of networks in an efficient manner.

It is another object of the present invention to provide a system for connecting together networks across long distances.

It is another object of the present invention to provide a system which does not change the protocols of the networks being connected.

It is a further object of the present invention to provide a system for transmitting local area network packets over a network backbone.

In an exemplary embodiment of the present invention, the system comprises a token bus network which is used as a backbone. A number of ethernet networks are each connected to the backbone through a bridge device known as a network interface module (NIM).

In operation, messages from one ethernet segment are enveloped by a NIM and sent over the token bus network to a NIM connected to the ethernet segment to which the message is intended. That NIM then de-envelopes the message and puts it out on the destination ethernet network. Each NIM has a unique I.D. code and each NIM stores information on which NIM is associated with which node. In this way, the NIM can direct the enveloped messages to the required NIM. The other ethernet networks are not disturbed.

It is therefore an advantage of the present invention in that it provides a system for connecting together a large number of networks in an efficient manner.

It is another advantage of the present invention in that it provides a system for connecting together networks across long distances.

It is a further advantage of the present invention in that it provides a system for transmitting local area network packets over a backbone network.

It is another object of the present invention in that it provides a system which does not change the protocols of the networks being connected.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a block diagram of a bridge system of the prior art;

FIG. 2 a block diagram of the system of the present invention;

FIG. 3 is a diagram of the medium access control headers for ethernet and token bus networks;

FIG. 4 a diagram of the backbone network packet of the present invention; and

FIG. 5 ls a block diagram of the network interface module of the present invention.

DETAILED DESCRIPTION OF THE PRESENT INVENTION

FIG. 1 shows a block diagram of a network bridge system of the prior art and is designated by the general reference number 10. System 10 includes a number of ethernet networks 12, 14, 16 and 18. A number of nodes, 20, 22, 24, 26, 28, 30, 32 and 34 are associated with the networks 12, 14, 16 and 18. The networks are connected in series by a number of bridges 36, 38 and 40.

The bridges 36, 38 and 40 typically contain memories for storing data. The stored data would include the addresses of nodes on the networks on either side of a bridge. For example, bridge 36 would have information stored associating nodes 20 and 22 with one side of bridge 36 and associating nodes 24, 26, 28, 30, 32 and 34 with the other side of bridge 36.

In operation, node 20 may want to transmit a message packet to node 22. The message packet contains information which identifies the source of the message as node 20 and the destination as node 22. The message would be transmitted on network 12 and node 22 would identify the message as being addressed to it. The bridge 36 would also receive the message. Bridge 36 would read the destination address and know that the message is intended for node 22. Bridge 36 already knows that node 22 is on the same side of bridge 36 as node 20 which originated the message, so bridge 36 can ignore the message.

Now, suppose node 20 wants to send a message to node 24. The packet is transmitted on network 12. Bridge 36 receives the message packet and determines that its destination is node 24. Bridge 36 knows that node 24 is on the other side of bridge 36, so bridge 36 would transmit the message packet to network 14. Since all of networks 12, 14, 16 and 18 are ethernets, there is no need for the medium access protocol of the message to be altered or translated and the bridge 36 can output the message packet with no change.

In another example, node 20 may want to send a message to node 32. The message packet with node 32 as its destination is placed on network 12. Bridge 36 reads the destination of the message and realizes it resides on the other side of bridge 36, so it transmits the message to network 14. Now bridge 38 reads the message and realizes that the destination node resides on the other side of bridge 38, so it transmits the message to network 16. Finally, bridge 40 reads the message. Bridge 40 knows that the destination resides on the other side of bridge 40, so it transmits the message to network 18. Node 32 can then pick up the message.

The problem with system 10 can now be appreciated. Messages between networks 12 and 18 must be transmitted across networks 14 and 16. The traffic on networks 16 and 14 is correspondingly increased. As more and more networks are added to the system in series, the traffic becomes greater and greater and the entire system becomes less efficient.

FIG. 2 shows a block diagram of one embodiment of the system of the present invention and is designated by the general reference number 50. System 50 comprises a plurality of ethernet networks 52, 54, 56 and 58. Network 52 has a plurality of nodes 60 and 62. Network 54 has a plurality of nodes 64 and 66. Network 56 has a plurality of nodes 68 and 70. Network 58 has a plurality of nodes 72 and 74. Each network has been illustrated with two nodes, though in actuality many more nodes would be associated with each network.

A token bus network 80 is used as a backbone for a system 50. A plurality of network interface modules (NIM)s 82, 84, 86 and 88 connect networks 52, 54, 56 and 58, respectively, to network 80. System 50 is shown with four ethernet networks connected to network 80, however, in operation, many more ethernet networks could be connected.

FIG. 3 shows a diagram of the structure of the packet headers in the medium access control protocol layer and is designated by the general reference number 100. An IEEE 802.3 reference network header 102 is shown. A destination field 104 provides information on the address to which the packet is directed. A source field 106 provides information of the party who sent the packet. A length field 108 defines the length of the packet. A data field 110 provides the high protocol layer information. A pad field 112 provides additional characters needed to achieve a minimum packet size. An FCS field 114 provides the frame check sequence. The FCS is a number which is calculated using an algorithm which uses the information in the other fields. This number is then recalculated at the destination to verify that the information in the packet is correct.

In commercial applications today, the ethernet network is commonly used. The header packet of the ethernet is the same as the IEEE 802.3 header with one exception. The length field of the IEEE 802.3 header has been made obsolete and the ethernet uses field 108 to contain information on the protocol type. In this way, two different protocol systems could work on the same ethernet network.

An IEEE 802.4 reference header 120 is also shown. Token bus networks use the IEEE 802.4 standard. A frame control field 122 identifies the frame type. A destination field 124 identifies the address to which the packet is being sent. A source field 126 identifies the address of the parties sending the packet. The data field 130 contains the higher protocol layer information. An FCS field 132 provides the frame check sequence. The data field 130 is further divided into a header 140 and a data area 142. Header 140 is an IEEE 802.2 LLC1 type 1 header which describes the data in data area 142. Data area 142 actually contains the higher protocol layer information.

It is apparent that translating between the ethernet header 102 and the token bus header 120 is difficult. Some fields must be eliminated and others added. Due to this fact, the FCS number must be recalculated based on the new frame. If an error was made in translating some of the data, the new FCS number would be calculated using the erroneous data. When the packet reaches the final destination and the FCS is checked, the error in translation would not be detected.

FIG. 4 shows a diagram of the IEEE 802.4 header as used in the present invention and is designated by the general reference number 150. The IEEE 802.4 reference is used in the token bus networks. The present invention avoids the problems of translating the ethernet header by enveloping the entire ethernet header inside the 802.4 data field. Header 150 contains a frame control field 152. A bridge destination field 154 designates the particular NIM address to which the message is addressed. A bridge source field 156 designates the NIM from which the packet originated. A field 157 comprises the data field 130 from the token bus frame 120. A header field 158 contains the header 140 from the token bus frame 120. Field 160 comprises the data area 142 of the token bus frame 120 and comprises the entire ethernet frame 102 including an ethernet destination field 162, an ethernet source field 164, a protocol-type field 166, an ethernet data field 168, and an ethernet FCS field 170. An 802.4 FCS field 172 follows the data field 157.

Returning now to FIG. 2, when system 50 is first put into operation, each NIM 82, 84, 86 and 88 start to construct address index tables. For example, suppose node 60 puts out a packet on network 52 for node 62. NIM 82 would receive the message and look at the ethernet source field (106 in FIG. 3). NIM 82 would then store node 60 with a number, zero for example, which would designate node 60 as being in network 52. At this point, NIM 82 would not have an address for node 62 stored. So, NIM 82 would envelope the ethernet header inside the token bus header as shown in FIG. 4. The bridge of NIM destination is unknown to NIM 82, and the bridge destination field 154 in FIG. 4 would have a multicast address to all other bridges, NIMs 84, 86 and 88 in this case. The bridge source field 156 would contain the address of NIM 82 on the backbone 80. The FCS field 172 would then be calculated using the entire token bus header 150.

NIM 84 would receive the token bus frame from NIM 82 over the token bus backbone network 80. NIM 84 would note the bridge source field 156 and the ethernet source field 164 of the packet. NIM 84 would store information associating node 60 with NIM 82. Next, NIM 84 will de-envelope the ethernet frame by removing the field 160 from the token bus frame 150. The ethernet message is then placed on network 54. Since the ethernet address is for node 62, all nodes on network 54 would disregard the message. The same procedure would occur in NIM 86 and 88 because they would also receive the multicast message.

After an initial start-up period, each of NIMs 82, 84, 86 and 88 will have stored information which associates every node with its particular NIM. Now if NIM 82 receives a message on network 52 from node 60 to node 62, NIM 82 would ignore the message. If node 60 sends a message for node 74, then NIM 82 would envelope the message and address it only to NIM 88. NIM 88 would de-envelope the packet and send it over network 58 to node 74. NIMs 84 and 86 would ignore the message because it is not addressed to them and networks 54 and 56 would not be disturbed at all.

System 50 can handle a large number of ethernet networks over one token bus network. This is because each packet sent over the token bus will be directed only to the proper destination network. The other ethernet networks do not have to be burdened with messages which are not intended for them. This greatly reduces the traffic load in each network and correspondingly increases the efficiency of each network.

FIG. 5 shows a block diagram of a NIM and is designated by the general reference number 200. NIM 200 has a microprocessor 210 which is connected to a bus 212. The microprocessor 210 is an Intel 80186 or equivalent. A dynamic RAM 214, an EPROM 216, an identification EEPROM 218, a BOOT PROM 220 and a non-volatile RAM 222 are all connected to bus 212. An interface co-processor 224 is connected between an ethernet network and bus 212. Co-processor 224 is an Intel 82586 microprocessor or equivalent. An interface co-processor 226 is connected to bus 212. Co-processor 226 is a Motorola 68824 microprocessor or equivalent. A modem is connected between co-processor 226 and a token bus network.

The BOOT PROM 220 is used to run test programs on the NIM components when the system is first turned on. This is much the same as in personal computer BOOT PROMs. When a message packet arrives from the ethernet network, the interface co-processor 224 determines if it is a valid message. If it is a valid message, then the message is stored in the dynamic RAM 214 and the microprocessor 210 is interrupted. The microprocessor 210 uses the software in the EPROM 216 to evaluate the message and if needed, envelope the message for transmission to the interface co-processor 226, modem 228 and on to the token bus network. The software in the EPROM 216 instructs the microprocessor 210 to store the addresses of the various nodes in the dynamic RAM 214 and the non-volatile RAM 222. If the NIM 200 experiences a power outage, then on power-up, the NIM 200 will still have addresses in the non-volatile RAM 222 and there is no need to relearn all of the addresses.

The identification EEPROM 218 contains a code address which is unique to each particular NIM. On power up this bridge address is stored in the interface co-processor 226. When a packet is received from the token bus, the interface co-processor 226 verifies the code address. If the message has a bridge destination different than that in the identification EEPROM 218 or multicast address, then the message is ignored. If the bridge destination is the same as this particular NIM or its multicast address then the co-processor 226 stores the message in dynamic RAM 214 and interrupts the microprocessor 210. The microprocessor 210 then uses software in 216 to de-envelope the message and output it on the ethernet network. The multicast address is also stored in the EPROM 216.

It can be seen that the system of the present invention utilizes the microprocessor 210 of the NIM 200 in an efficient manner. The microprocessor is only disturbed by messages on the backbone network 80 if the messages are specifically directed to it. The co-processor 226 filters out other backbone messages. Messages from the ethernet network must all be evaluated by the microprocessor 210.

The preferred embodiment of the present invention has been described using ethernet networks for the local area networks and using a token bus network for the backbone network. However, other types of networks could be substituted for the local area network and the backbone network.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appending claims be interpreted as covering all alterations and modifications as fall within the true spirit and scope of the invention.

I claim:

1. A network interface module (NIM) for connecting a local area network to a backbone network comprising:

a first interface means connected to a local area network for transmitting and receiving local area network messages to and from said local area network;

a second interface means connected to a backbone network for transmitting and receiving backbone network messages to and from said backbone network;

a memory means connected to said first and second interface means for storing a bridge identification address of a particular NIM, a table of addresses, and for temporarily storing said local area network and backbone network messages; and a logic means connected to the first and second interface means and the memory means for storing a local area network source address in said local area network message in said table of addresses in association with said bridge identification address of said particular NIM, comparing a destination address in said local area network message with said table of addresses, and if the destination address is associated with the bridge identification address of said particular NIM, then ignoring said local area network message, and if the destination address is associated with a bridge identification address of a NIM other than said particular NIM, then enveloping said local area network message in a backbone network message having a header specifically addressed to said other NIM, and if the destination address is not associated with any of the addresses in said address table then enveloping said local area network message in a backbone netowrk message addressed to be multicast to all other NIMs on said backbone network, the logic means also being for storing local area network source address information in said backbone message in said table of addresses in association with a bridge identification address in said backbone message, and de-enveloping said backbone network message for transmission to said local area network.

2. The device of claim 1 wherein,
the logic means envelopes a local area network message into a backbone network message by putting the local area network message into the data field of a backbone message, adding a destination address frame comprised of either a bridge identification address or a multicast address, and adding a source address frame comprised of said bridge identification address of this particular NIM.

3. The device of claim 2 wherein,
the logic means further envelopes a local area network message and a backbone network message by calculating a backbone frame check sequence and adding it after said data field of said backbone message.

4. The device of claim 3 wherein,
the logic means de-envelopes a backbone message by using the backbone frame check sequence to verify the accuracy of said backbone message and if it is a valid message, then the logic means takes the entire data field of the backbone message and passes it to the first interface means for transmission to the local area network.

5. The device of claim 1 wherein,
the second interface means is an interface co-processor.

6. The device of claim 1 wherein,
the backbone network is a token bus network.

7. A method for connecting a local area network to a backbone network comprising the steps of:
connecting a first interface means to a local area network, for transmitting and receiving local area network messages to and from said local area network;
connecting a second interface means to a backbone network, for transmitting and receiving backbone network messages to and from said backbone network;
connecting a memory means to said first and second interface means, said memory means containing a bridge identification address of a first bridge and a table of addresses;
connecting a logic means to said first and second interface means and said memory means, wherein said logic means, said first and second interface means and said memory means comprise a first bridge;
receiving a local area network message in said first interface means and temporarily storing said local area network message in said memory means;
using the logic means to store information from a local area network source address in said local area network message in said table of addresses in assoication with said bridge identification address of said first bridge;
using said logic means to compare a destination address in said local area network message with said table of addresses, and if the destination address is associated with the bridge identification of said first bridge which is stored in said memory means, then ignoring said local area network message, and if the destination address is associated with a bridge identification address of a second bridge, then enveloping said local area network message in a backbone network message addressed to said second bridge, and if the destination address is not associated with any of the bridge addresses in said address table, then enveloping said local area network message in a backbone network message addressed to be multicast to all other bridges on said backbone network;
receiving and evaluating a backbone network message at said second interface means and temporarily storing said backbone network message in said memory means if said backbone network message is valid;
using said logic means for storing local area network source address information in said backbone message in said table of addresses in association with a birdge identification address in said backbone message; and
using said logic means for de-enveloping a valid backbone message for transmission to said local area network.

8. A method for connecting a local area network to a backbone network comprising the steps of:
connecting a local area network to a backbone network by means of a first bridge having an address table and first bridge address;
receiving a local area network message from said local area network at said first bridge and comparing a node address in a node destination frame of said local area network message with said address table, and if said node address is associated with said first bridge address then ignoring said local area network message, and if said node address is associated with a second bridge address then enveloping said local area network message in a data frame of a backbone network message having a bridge destination frame containing said second bridge address for transmission to said backbone network, and if said node address is not associated with any bridge addresses, then enveloping said local area network message in a data frame of a backbone network message having a bridge destination frame containing a multicast address for transmission to said backbone network; and
receiving a backbone network message from said backbone network at said first bridge, and if a bridge address in a bridge destination address frame of said backbone network message is equal to either a multicast address or said first bridge address, then de-enveloping a local area network message contained in a data frame of said backbone message and transmitting said local area network message to said local area network.

9. The method of claim 8 wherein,
said enveloping further comprises adding a bridge source frame containing said first bridge address.

10. The method of claim 9 wherein,
said table of addresses in said first bridge is constructed by receiving local area network messages from said local area network and associating a node address contained in a node source frame of said local area network message with said first bridge address, and receiving backbone network messages at said first bridge from said backbone network and associating a node address contained in a node source frame of said backbone network message with a bridge address contained in a bridge source frame in said backbone network message.

11. A bridge system for connecting networks, comprising a plurality of local area networks, each local area network comprising a plurality of nodes and each node having a unique node address, each network connected to a bridge and each bridge having a unique bridge address, each bridge connected to a backbone network, and wherein each bridge comprises:

mesans for transmitting and receiving a local area network message to and from a first local area network;

means for transmitting and receiving a backbone network message to and from said backbone network;

a storage means for storing a table of addresses associating each node address with its respective bridge address;

means for comparing a node address in a destination node frame in a local area network message received from said first local area network with said table of addresses, and if said node address is associated with a bridge address, then enveloping said local area network message received from said first local area network in a backbone network message data frame, said backbone network message having a bridge destination frame containing said bridge address, and transmitting said backbone message to said backbone network.

12. A bridge system for connecting networks, comprising a plurality of local area network, each local are a network comprising a plurality of nodes and each node having a unique node address, each network connected to a bridge and each bridge having a unique bridge address, each bridge connected to a backbone network, and wherein each bridge comprises:

means for transmitting and receiving a local area network message to and from a first local area network;

means for transmitting and receiving a backbone network message to and from said backbone network;

a storage means for storing a table of addresses associating each node address with its respective bridge address; and means for comparing a node address in a destination node frame in a local area network message received from said first local area network with said table of addresses, and if said node address is associated with a bridge address of this particular bridge, then ignoring local area network message, and if said node address is associated with a bridge address other than a bridge address for this particular bridge, then enveloping said local area network message received from said first local area network in a backbone message data frame, said backbone message having a bridge destination frame containing said bridge address, and transmitting said backbone message to said backbone network.

13. A bridge system for connecting networks, comprising a plurality of local area networks, each local area network comprising a plurality of nodes and each node having a unique node address, each network connected to a bridge and each bridge having a unique bridge address, each bridge connected to a backbone network, and wherein each bridge comprises:

means for transmitting and receiving a local area network message to and from a first local area network;

means for transmitting and receiving a backbone network message to and from said backbone network;

a storage means for storing a table of addresses associating each node address with its respective bridge address;

means for comparing a node address in a destination node frame in a local area network message received from said first local area network with said table of addresses, and if said node address is associated with a bridge address, then enveloping said local area network message received from said first local area network in a backbone message data frame, said backbone message having a bridge destination frame containing said bridge address, and transmitting said backbone message to said backbone network, and if said node address is not associated with a bridge address, then enveloping said local area network message received from said first local area network in a backbone message data frame, said backbone message having a bridge destination frame containing a multicast bridge address, and transmitting said backbone message to said backbone network.

14. A bridge system for connecting networks, comprising a plurality of local area networks, each local area network comprising a plurality of nodes and each node having a unique node address, each network connected to a bridge and each bridge having a unique bridge address, each bridge connected to a backbone network, and wherein each bridge comprises:

means for transmitting and receiving a local area network message to and from a first local area network;

means for transmitting and receiving a backbone network message to and from said backbone network;

a storage means for storing a table of addresses associating with node address with its respective bridge address;

means for comparing a node address in a destination node frame in a local area network message received from said first local area network with said table of addresses, and if said node address is associated with a bridge address of this particular bridge, then ignoring said local area network message, and if said node address is associated with a bridge address other than the bridge address associated with this particular bridge, then enveloping said local area network message received from said first local area network in a backbone message data frame, said backbone message having a bridge destination frame containing said bridge address, and transmitting said backbone message to said backbone network, and if said node address is not associated with a bridge address, then enveloping said local area network message received from said first local area network in a backbone message data frame, said backbone message having a bridge destination frame containing a multicast bridge address, and transmitting said backbone message to said backbone network.

* * * * *